United States Patent
Choi

(10) Patent No.: US 6,176,254 B1
(45) Date of Patent: Jan. 23, 2001

(54) FLOW CONTROL VALVE USING A DIRECT CURRENT MOTOR

(75) Inventor: Hwan-Young Choi, Kyonggi-do (KR)

(73) Assignee: Samsung Electronics Co., Ltd., Kyungki-Do (KR)

( * ) Notice: Under 35 U.S.C. 154(b), the term of this patent shall be extended for 0 days.

(21) Appl. No.: 09/289,599

(22) Filed: Apr. 12, 1999

(30) Foreign Application Priority Data

Apr. 13, 1998 (KR) .................................................. 10-13061

(51) Int. Cl.$^7$ .................................................. F16K 49/00
(52) U.S. Cl. ............... 137/334; 137/625.69; 137/119.08; 137/270; 251/263; 251/249.5; 251/175; 251/129.03
(58) Field of Search ................................ 251/263, 249.5, 251/175, 129.03; 137/625.69, 119.08, 270; 775/4

(56) References Cited

U.S. PATENT DOCUMENTS

| | | | |
|---|---|---|---|
| 1,728,015 | * | 9/1929 | Spoehrer ........................... 251/249.5 |
| 1,903,229 | * | 3/1933 | Colman et al. ....................... 251/263 |
| 1,959,811 | * | 5/1934 | Brady et al. ......................... 251/263 |
| 1,989,942 | * | 2/1935 | Parks et al. ......................... 251/263 |
| 3,209,784 | * | 10/1965 | Schwartz ........................... 251/249.5 |
| 3,352,324 | * | 11/1967 | Stryker ............................. 137/625.69 |
| 3,469,461 | * | 9/1969 | Ludwig ................................. 251/263 |
| 3,515,442 | * | 6/1970 | Whittemore .......................... 251/263 |
| 4,136,655 | * | 1/1979 | Mannhardt ....................... 137/625.69 |
| 4,546,787 | * | 10/1985 | Meyers et al. .................. 137/119.08 |
| 4,616,528 | * | 10/1986 | Malinski et al. ........................ 475/4 |
| 4,664,356 | * | 5/1987 | Becker et al. ........................ 251/175 |
| 4,700,735 | * | 10/1987 | Hamernik et al. ................... 137/270 |
| 4,760,989 | * | 8/1988 | Elliott et al. ..................... 251/129.03 |

* cited by examiner

Primary Examiner—A. Michael Chambers
Assistant Examiner—Thomas L. McShane
(74) Attorney, Agent, or Firm—Sughrue, Mion, Zinn, Macpeak & Seas, PLLC

(57) ABSTRACT

A flow control valve for allowing the flow to be controlled on a proportional basis using a direct current(DC) motor thereby improving the flow control function. The flow control valve is constructed in a manner that a valve housing having a guide space and an inlet and an outlet is formed on the both sides of the valve housing, the inlet and the outlet being in communication with each other through the guide space. A spool is installed inside the guide space of the valve housing and up/down movably coupled therein so as to control the opening of the outlet. A spool guide is placed on the upper side of the guide space passing through liquified coolant by moving up/down along with the spool. A elastic support elastically supports the spool guide to one direction. A sealing member prevents the leakage of liquefied coolant by surrounding the spool on the lower side of the valve housing. A driving mechanism moves the spool up/down by use of a DC motor.

15 Claims, 8 Drawing Sheets

FLOW CONTROL VALVE USING A DIRECT CURRENT MOTOR

BACKGROUND OF THE INVENTION

1. Field of the Invention

The present invention relates to a flow control valve employed in a refrigerating cycle, and more particularly, to a flow control valve using a direct current(DC) motor for improving the control of flow, and its durability.

2. Description of the Related Arts

Generally, a refrigerating cycle comprises an evaporator, a compressor, a condenser, an expansion valve, etc., and decreases the temperature of its surrounding environment by the mechanism of evaporation, compression, condensation, and expansion of coolant.

Describing the mechanism in more detail, the liquefied coolant inside the evaporator of the refrigerating cycle is evaporated by taking latent heat needed for its evaporation from the air around a cooling line. Then, the air is cooled down, its temperature decreased after its latent heat being taken, thereby maintaining the interior of, for example, a refrigerator operated by the refrigerating cycle at low temperature by its natural circulation or by the operation of a certain fan. The coolant supplied from an expansion valve and the evaporated coolant vapor exist together inside the evaporator, and during the phase transition from the liquid state to the vapor state, there is a certain relation between the pressure and the temperature of the evaporation.

The coolant vapor evaporated from the evaporator is supplied to the compressor to facilitate continuous evaporation of the liquefied coolant even under a low temperature by maintaining a low pressure inside the evaporator. Then, the coolant vapor supplied to the compressor is compressed by a piston of a cylinder so that it becomes easily liquefied because of its increased pressure even by cooling it by a cooling water or a cooling air at room temperature.

Then, the compressed coolant from the compressor is cooled, condensed, and liquefied at the condenser. The condensation at the condenser also occurs in the state that the liquefied coolant and the evaporated coolant exist together like in the above evaporation. During the phase transition from vapor to liquid, there is a certain relation between the pressure and the temperature of the condensation.

Expansion is performed to reduce the pressure of the liquefied coolant by the condenser enough to be easily evaporated in advance before supplying the liquefied coolant to the evaporator. An expansion valve functions to reduce the pressure, which is the expansion, and also to control the flow of the liquefied coolant. That is, the amount of the liquefied coolant to be evaporated inside the evaporator is determined according to the heat amount to be taken away from the interior of a refrigerator, the evaporation temperature and the evaporation pressure. It is very important to supply the proper amount of the liquefied coolant to the evaporator, exactly controlling it so as not to be over/short-supplied.

That is, the expansion valve adiabatically expands the liquefied coolant at a high temperature and a high pressure to the state of a low temperature and a low pressure by the throttling operation and functions as a flow control valve to maintain a supply amount of the liquefied coolant at a certain level according to the load of the evaporator.

Many types of the expansion valves that are commercially known vary the controlling method and structure. Recently, throttling of the flow control valve is widely known because of its high operation capability, fine control, and reduced manufacturing expenses, etc.

One typical embodiment thereof is described herein after with reference of the drawings.

As shown in FIG. 1, the flow control valve comprises a cap 1 having a certain shape, a heating bottom plate 3, which is made of ceramic material, and has an expansion agent opening 2 on both sides, an Al-electrode 5, which is fixably attached on the upper side of the heating bottom plate 3, and has a Ta—Al heating electrode 4 on its middle, a diaphragm 7 having a spacer 6 and fixably attached on the top circumference of the Al-electrode 5, the diaphragm 7 being made of, for example, copper (Cu), attaching layers 8, 9(referred to as "filler"), placed between the top of the Al-electrode 5 and the bottom of the spacer 6, and between the top of the spacer 6 and the bottom of the diaphragm 7 respectively so as to improve the adhesiveness between them, an expansion agent 10, which fills the space between the Al-electrode 5 and the diaphragm 7, a sealing bottom plate 11 fixed on the bottom of the heating bottom plate 3 for shutting down the expansion agent opening 2.

In FIG. 1, reference numeral 12 identifies a power line.

The cap 1 comprises a space 1a occupying a certain space there inside for passing liquefied coolant, and an inlet 1b and an outlet 1c on its top, the liquefied coolant being in communication with the space 1a through the inlet 1b and the outlet 1c.

The flow control valve of the throttling type is constructed in a manner that the Al-electrode 5 having a Ta—Al heating electrode 4 is fixably attached on the top of the heating bottom plate 3, and a lower attaching layer 8, the spacer 6, a upper attaching layer 9, and the diaphragm 7 are sequentially attached on the top of the Al-electrode 5 thereby forming a certain space inside the Al-electrode 5, the spacer 6, and the diaphragm 7.

Then, an expansion agent 10 is induced through the expansion agent opening 2 on the bottom of the heating bottom plate 3, the expansion agent opening 2 is sealed by fixably attaching a sealing bottom plate 11 on the bottom of the heating bottom plate 3, the sealing bottom plate 11 is fixably attached on the bottom of the cap 1, and the power line 12 of the Al-electrode 5 is taken out of the cap 1.

The center of the diaphragm 7 is placed directly under the outlet 1c formed on the cap 1.

In the conventional flow control valve as described above, liquefied coolant is induced through the inlet 1b of the cap 1, passes through the space 1a there inside, and discharged through the outlet 1c to the evaporator. When controlling the flow of the liquefied coolant, power is applied on the Al-electrode 5 through the Ta—Al heating electrode 4 of the Al-electrode 5, the Ta—Al heating electrode 4 of the Al-electrode 5 emits heat, and the expansion agent 10 filling the Al-electrode 5, the spacer 6, and the diaphragm 7 is expanded so that by the heat expansion of the expansion agent 10, as shown in FIG. 2, the center of the diaphragm 7 is expanded toward the outlet 1c of the cap 1, and the whole flow amount of the liquefied coolant is controlled by controlling the amount of the liquefied coolant discharged through the outlet 1c.

However, the conventional throttling type of the flow control valve controls the flow amount of the coolant by heating the Ta—Al heating electrode 4 and expanding the expansion agent 10. However, it has disadvantages, such as the inability to proportionally control the flow. Also, there is a demand for addressing the many difficulties involved with the use of the expansion agent 10.

The above-noted difficulties of use of the expansion agent 10 include imperfection of sealing to completely prevent the leakage of the expansion agent 10 and, the decreased endurance of the diaphragm 7 according to the repeated expansion and the shrinkage of the expansion agent 10. These serve as reasons to decrease the reliability for the flow control valve and shorten the life time of the all components.

SUMMARY OF THE INVENTION

The present invention is directed to a flow control valve for allowing the flow to be controlled on a proportional basis using a (DC) direct current motor, thereby optimizing the function of the flow control.

Another object of the present invention is to provide a flow control valve for relieving the need for the use of expansion agents and a diaphragm, thereby further increasing the endurance of system components.

To achieve these and other advantages and in accordance with the purpose of the present invention as embodied and broadly described, the flow control valve using a DC motor comprises a valve housing having a guide space and an inlet and an outlet formed on both sides of the valve housing, the inlet and the outlet being in communication with each other through the guide space, a spool installed inside the guide space of the valve housing and up/down movably coupled therein so as to control the opening of the outlet, a spool guide placed on the upper side of the guide space, and passing through liquefied coolant by moving up/down along with the spool, a supporting means for elastically supporting the spool guide to one direction, a sealing means surrounding the spool on the lower side of the valve housing surrounding the spool so as to prevent the leakage of liquefied coolant, and a driving means for moving up/down the spool with a DC motor therein.

According to one embodiment of the present invention, the spool guide may be formed in a manner that a number of passage recesses are provided on its circumferential surface with open passage recesses to allow liquefied coolant to pass.

According to another embodiment of the present invention, the spool guide may be shaped in a manner that a number of passage holes are provided thereon displaced at a constant interval from each other radially from its center.

The housing and the guide space are provided sequentially in a line, the outlet is provided perpendicularly to the guide space, and an in-hole and an out-hole are provided on the inner end of the inlet and the outlet, respectively, and having a smaller radius than that of the inlet and the outlet respectively, the in-hole and the out-hole being in communication with the guide space.

The sealing means is a bellows fixed on the bottom of the valve housing and surrounding the lower side of the spool.

One embodiment of the driving means, may comprise a DC motor, a gear train for transmitting the rotation force of the DC motor, and a cam member for moving up/down the spool rotated by the gear train.

Another embodiment of the driving means, may comprise a bracket for supporting the bottom of the valve housing, a DC motor fixed on a certain position of the bracket, a first gear directly connected to the DC motor, a second gear having a large gear and a small gear integrated with each other, rotatably fixed on the one end of the bracket, and rotated by the first gear, a third gear rotatably fixed on the other end of the bracket, and rotated by the second gear, a circular disc cam having a short-radius part and a long-radius part, integrated with the third gear, and driving the spool having the bellows coupled thereon, and a cam sensing means for sensing the location of the circular disc cam.

At least one surface of the circumferential surface of the circular disc cam and the bottom of the bellows in contact with the circumferential surface is preferably coated with $MoS_2$ to reduce the coefficient of the friction against the other.

The cam sensing means may comprise a program switch fixed on a certain position of the bracket, a number of patterns having a certain shape formed on the top of the bracket, a program switch gear rotatably fixed on a supporting shaft fixed on a certain position of the bracket, and penetrating the program switch, and an elastic brush fixed on the bottom of the program switch gear, capable of contact with each pattern on the program switch.

A bushing is provided on the supporting shaft so as to support the rotation of the program switch gear, and the bushing is coupled with the program switch.

A recess is formed on a certain position of the bracket, and a shaft guide is fixed on the recess to support a rotation shaft of the DC motor.

It is to be understood that both the foregoing general description and the following detailed description are exemplary and explanatory and are intended to provide further explanation of the invention as claimed.

BRIEF DESCRIPTION OF THE DRAWINGS

These and other objects, features and advantages of the present invention will be described with reference to the accompanying drawings, in which:

FIG. 1 is a cross-sectional view showing that an expansion agent is not expanded, and FIG. 2 is a cross-sectional view showing that an expansion agent is expanded and a diaphragm is inflated;

FIG. 4 is a partial cross-sectional view showing that the valve is maximally open, and FIG. 5 is a partial cross-sectional view showing that the valve is maximally closed;

DETAILED DESCRIPTION OF THE PREFERRED EMBODIMENTS

Reference will now be made in detail to the preferred embodiments of the present invention, examples of which are illustrated in the accompanying drawings.

Figure 1:
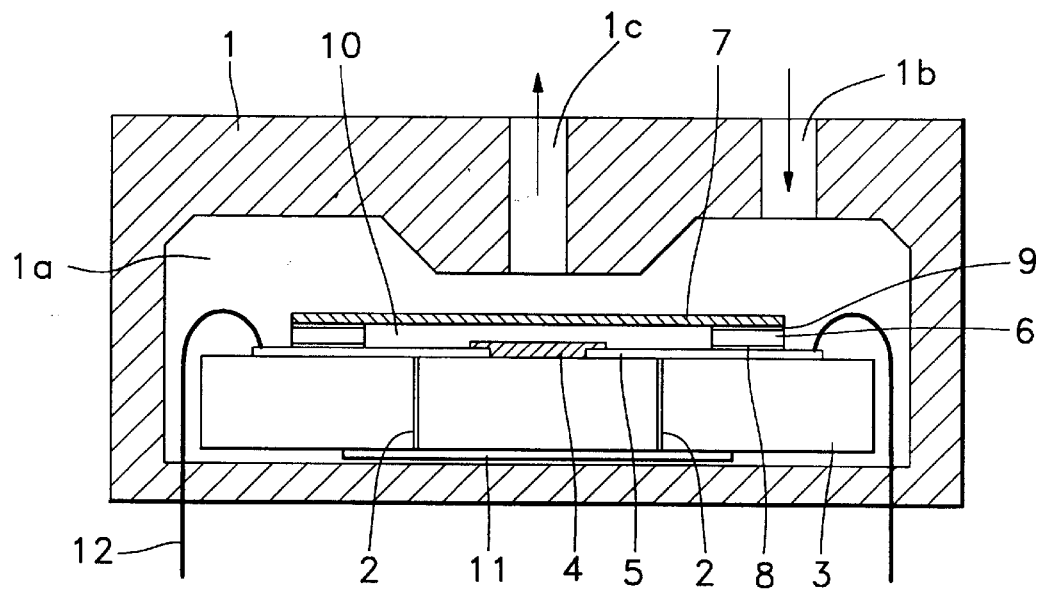
FIGS. 1 and 2 show the construction and the function of the conventional flow control valve.
Figure 2:
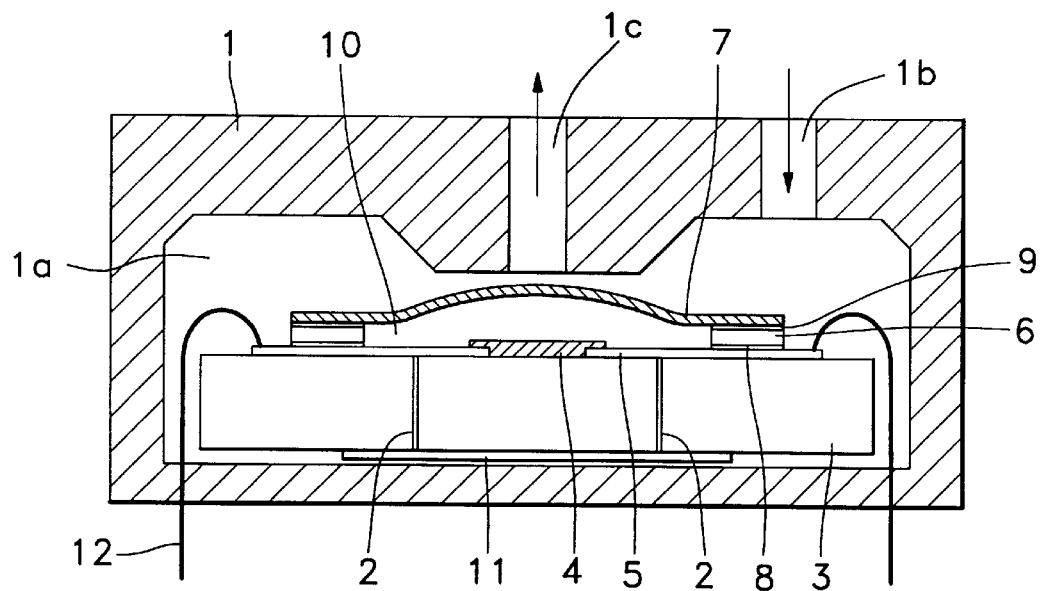
Figure 3:
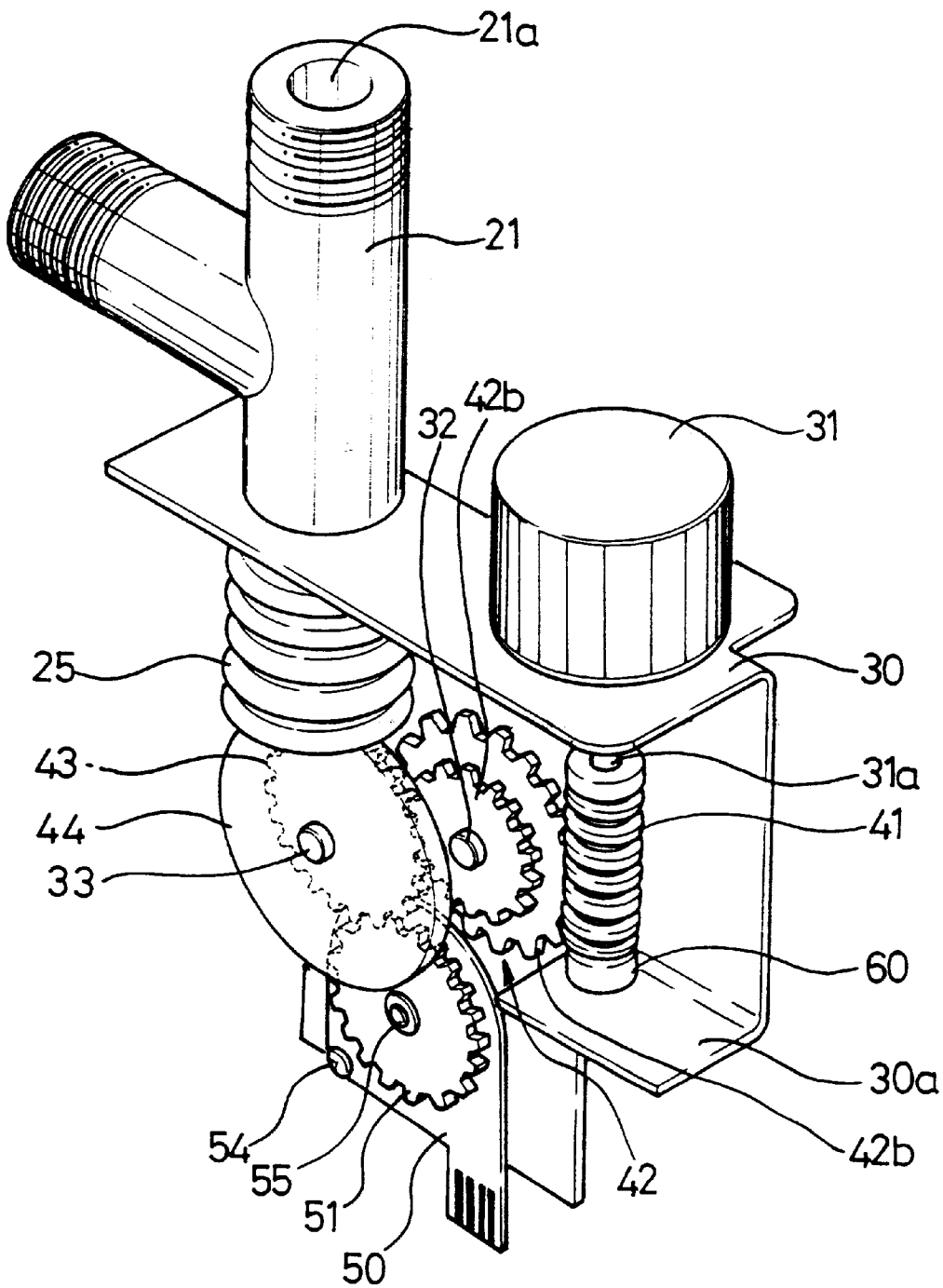
FIG. 3 is a side-elevated view showing the construction of the flow control valve using a DC (direct current) motor according to the present invention.
Figure 4:
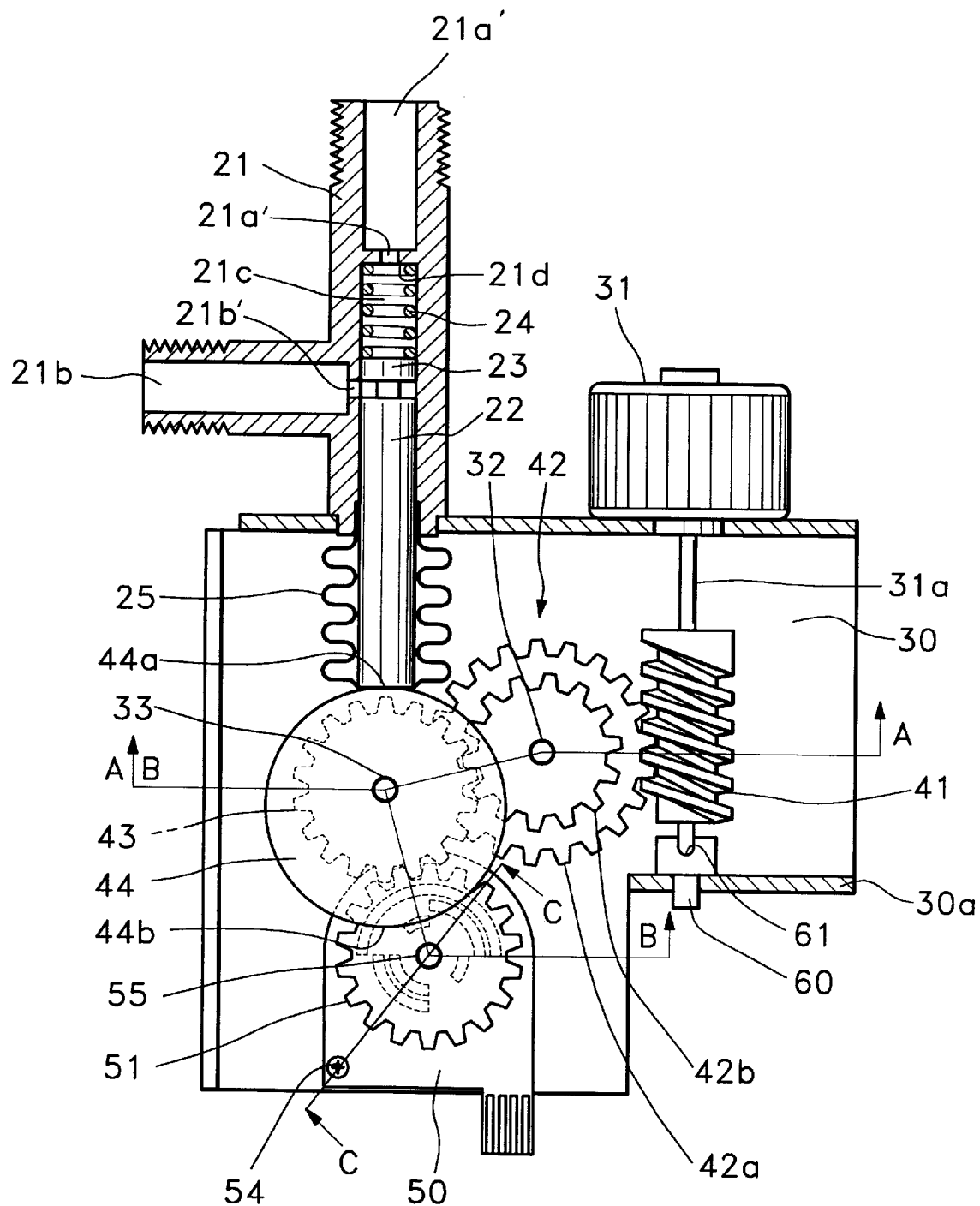
FIGS. 4 and 5 show the construction and the function of the flow control valve according to the present invention.
Figure 5:
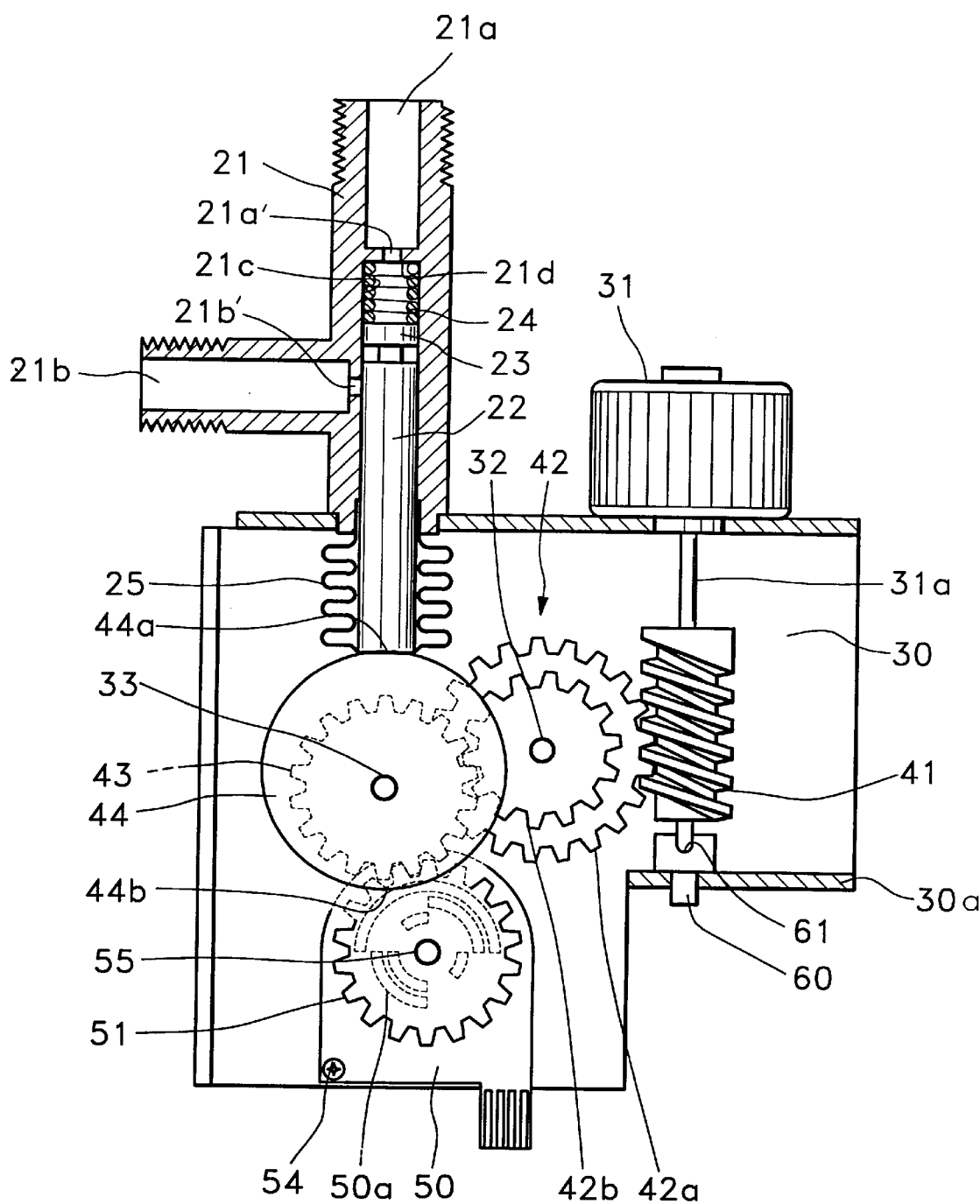
Figure 6:
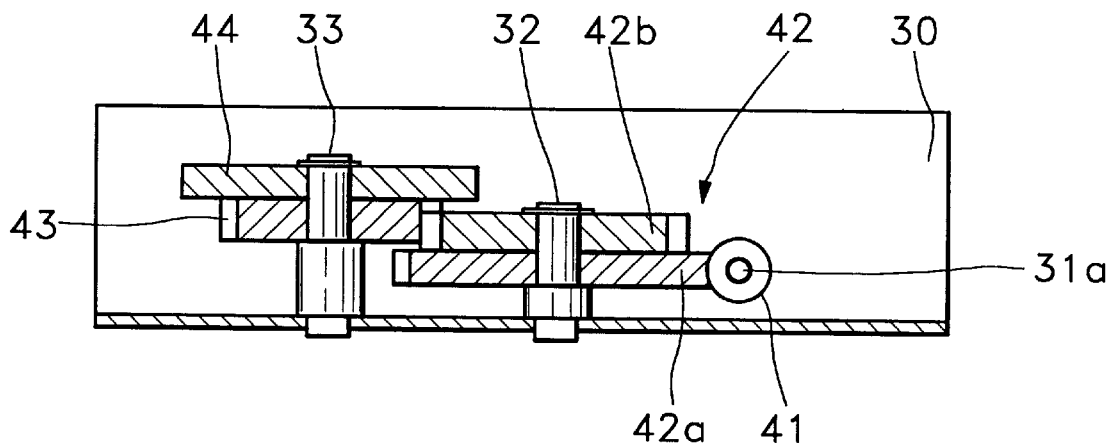
FIG. 6 is a cross-sectional view taken along the line A—A of FIG. 4.
Figure 7:
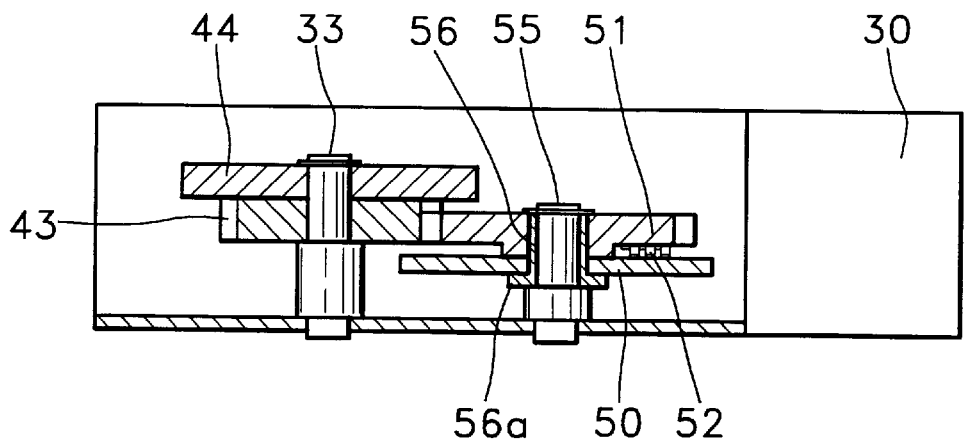
FIG. 7 is a cross-sectional view taken along the line B—B of FIG. 4.

FIG. 3 is a side-elevated view showing the construction of the flow control valve using a DC (direct current) motor according to the present invention, FIGS. 4 and 5 are partial cross-sectional views showing the construction and the function of the flow control valve according to the present invention, FIG. 6 is a cross-sectional view taken along the line A–A' of FIG. 4, and FIG. 7 is a cross-sectional view taken along the line B–B' of FIG. 4.

As described above, the flow control valve is constructed in a manner that an inlet 21a and an outlet 21b are provided on the both sides of a valve housing 21, the inlet 21a and the outlet 21b being in flow communication with each other through a guide space 21c occupying the inner space of the valve housing 21, a spool 22 is up/down movably attached on the guide space 21c of the valve housing 21 so as to control the opening of the outlet 21b, a spool guide 23 is placed on the upper side of the guide space 21c moving up/down along with the spool 22, liquefied coolant passing therethrough, a supporting means is placed on the top of the spool guide 23 to elastically support the spool guide 23, a sealing means is attached on the lower side of the valve housing 21 surrounding the spool 22 to prevent the leakage of liquefied coolant of a high pressure, and a driving means drives the up/down movement of the spool 22 with a DC (direct motor) motor 31.

The inlet 21a of the valve housing 21 and the guide space 21c are installed sequentially in a same line, and the outlet 21b is installed perpendicular to the guide space 21c. An in-hole 21a' and an out-hole 21b' are provided on the inner end of the inlet 21a and the outlet 21b respectively, and each have having a smaller radius than that of the inlet 21a and the outlet 21b respectively The in-hole 21a' and the out-hole 21b' are in communication with the guide space 21c.

Figure 8:
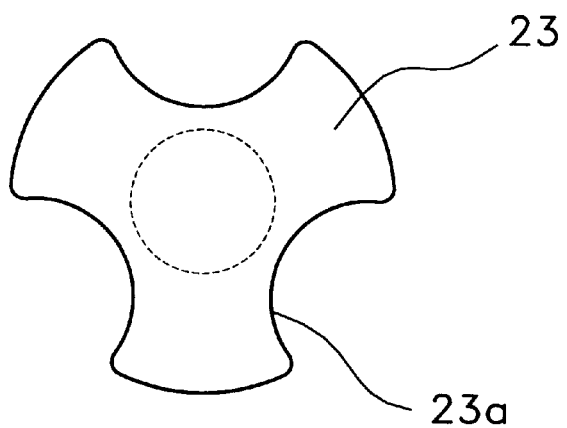
FIGS. 8 and 9 are plane views showing the embodiments of a spool guide of the flow control valve according to the present invention.

The spool guide 23, as shown in FIG. 8, is constructed in a manner that a number of passage recesses 23a for passing through liquefied coolant are formed on its circumferential surfaces. Preferably, the passage recesses 23a are radially displaced at a constant interval.

Figure 9:
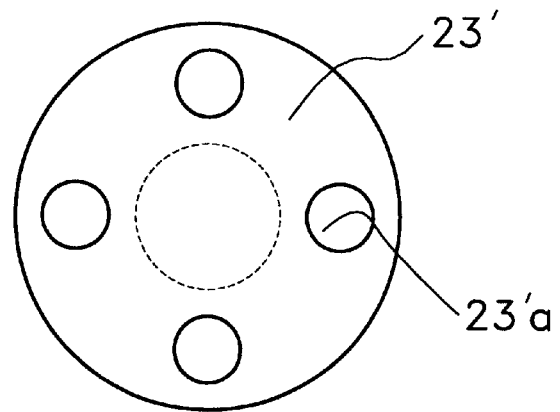

The shape of the spool guide 23 is not limited to the embodiment of the present invention as set forth herein, FIG. 8, but as shown in FIG. 9, or a number of passage holes 23'a may be radially formed on the spool guide 23' at constant interval from each other.

The supporting means preferably uses a compressed coil spring 24, and the top of the compressed coil spring 24 is supported by a projection 21d formed on the guide space 21. The bottom of the compressed coil spring 24 is supported by the upper circumference of the spool guide 23 so as to elastically support the spool guide 23.

If the spool 22 is moved down and large amount of liquefied coolant is introduced into the inlet 21a, the spool guide 23 is moved down by the hydraulic pressure of the liquefied coolant, and the large amount of the liquefied coolant is discharged out of a out-hole 21b' and an outlet 21b.

The sealing means is a bellows 25 having a good sealing capability and a good elasticity in the Y-axis.

The bellows 25 is attached under the valve housing 21 preferably using epoxy bond because the upper side of the valve housing 21 is subject to a high pressure, but the lower side thereof is not subject to a high pressure.

Meantime, the driving means comprises a DC motor for generating a driving force, a gear train for transmitting the rotation force of the DC motor, and a cam member for moving the spool 22 up/down by rotating the gear train.

Describing the embodiment of the driving means comprising the DC motor, the gear train, and the cam member in more detail, the driving means comprises a bracket 30 fixed on the bottom of the valve housing 21 with a typical fixing means such as a fixing bolt, etc., a DC motor 31 fixed on the upper one end of the bracket 30 by a typical fixing means, such as a fixing bolt, and having a rotation shaft 31a which penetrates the bracket 30, and is extended downward, a first gear 41 fixed on the rotation shaft 31a of the DC motor 31, a second gear 42 and a third gear 43 rotatably coupled with the supporting shaft 32, 33 fixed on the both ends of the bracket 30 respectively, a circular disc cam integrally formed with the third gear 43, the lower side of the bellows 25 contacted with a certain position of its circumferential surface, and a cam sensing means for sensing the location of the circular disc cam 44 so as to control the DC motor 31.

The first gear 41 is a worm gear, the second gear 42 comprises a large gear 42a and a small gear 42b, which have different diameters respectively, and are integrated with each other, the third gear 43 is a spur gear, the first gear 41 meshes with a worm wheel, i.e. the large gear 42a of the second gear 42, and the small gear 42b of the second gear 42 meshes with the third gear 43.

A circular disc cam roller 44, which is integrated with the third gear 43, comprises a short-radius part 44a having the shortest radius and a long-radius part 44b having the longest radius. The spool 22 contact the circumferential surface of the circular disc cam 44 and moves up/down by the radius difference.

At least one side of the circumferential surface of the circular disc cam 44 and the bottom of the bellows 25 contacted with the circumferential surface is preferably coated with $MoS_2$ in order to reduce the coefficient of the friction.

The DC motor 31 has good functional characteristics such as a quick accelerating capability required for a control motor such as high torque and linear rotation characteristics, etc.

Figure 10:
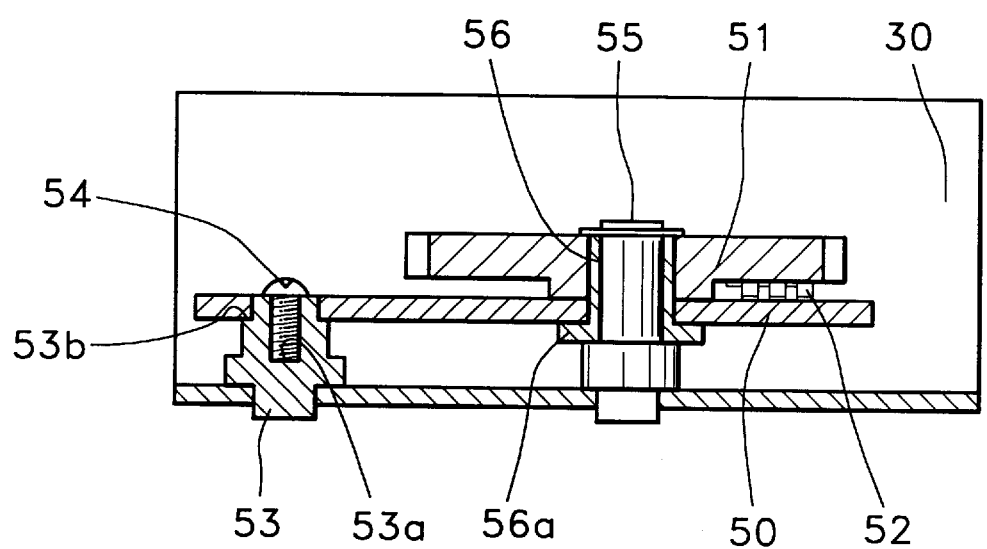
FIG. 10 is a cross-sectional view taken along the line C—C of FIG. 4.
Figure 11:
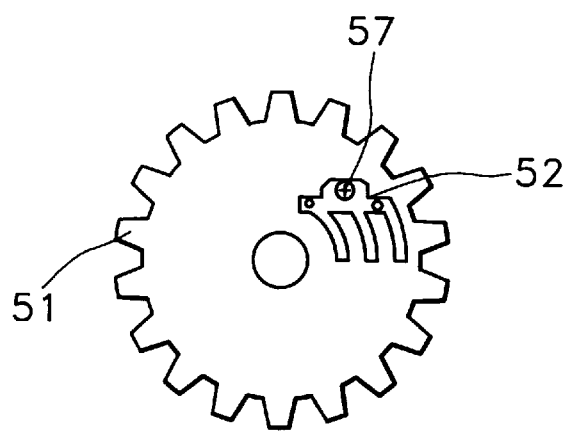
FIG. 11 is a view of a program switch gear of the flow control valve according to the present invention.
Figure 12:
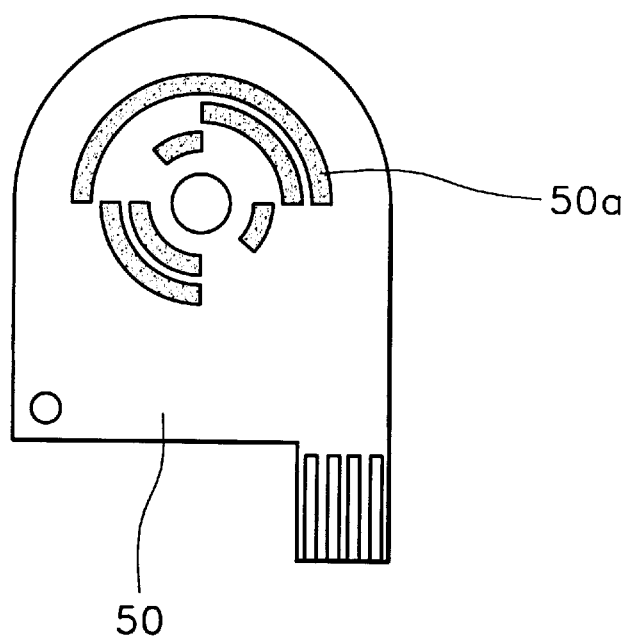
FIG. 12 is a plane view showing a program switch of the flow control valve according to the present invention.

The cam sensing means, as shown in FIGS. 10 and 12, comprises a plate-shaped program switch 50 fixed on a certain location of the bracket 30 with a number of patterns 50a having a certain shape on the top of the program switch 50, a program switch gear 51 rotatably fixed on a certain location of the bracket 30 penetrating the program switch 50 and meshing with the third gear 43, and an elastic brush 52 fixed on the bottom of the program switch gear 51, and contacting each pattern 50a on the program switch 50.

The cam sensing means controls the flow step by step according to the levels provided on each mode of the program switch 50.

Describing it in more detail, a locking bolt 53a and a projection 53b are formed on the upper side of the bracket 30, a fixing member 53 having a certain height is fixed, the program switch 50 is supported on the projection 53b of the fixing member 53, and a fixing bolt 54 is coupled as the locking bolt 53a so as to fix the program switch 50.

In addition, a supporting shaft 55 is fixed on a certain location of the bracket 30, and a program switch gear 51 is rotatably connected to the supporting shaft 55.

A bushing 56 is fit into the supporting shaft 55 so as to support the rotation movement of the program switch gear 51, and the program switch 50 fixed on the fixing member 53 is coupled with the bushing 56.

The patterns 50a of the program switch 50 are formed in concentric circles centering the supporting shaft 55.

A recess 56a is formed on the bottom of the bushing 56 so as to stably support the program switch 50.

The elastic brush 52 is fixed on the program switch gear 51 preferably by means of a fixing screw 57 as the embodiment of the present invention, which is, however, not limited to this, and various kinds of fixing means can be used.

A recess 30a is formed on a certain location of the lower side of the bracket 30, and on the recess 30a is formed a shaft guide 61 having a supporting groove 61a to prevent the sliding of the first gear 41 by supporting the lower side of the rotation shaft 31a of the DC motor 31.

The driving means is not limited to the embodiment of the present invention, and so, various types of construction are possible so that a spool 22 can be efficiently moved up/down using the DC motor 31.

The more detailed description for the function of the flow control valve according to the present invention is made as follows.

FIG. 4 shows that the flow control valve of the present invention is maximally open, wherein the lower side of the bellows 25, coupled with the spool 22 is contacted with a short-radius part 44a of the circular disc cam 44, and the spool 22 is moved down along the guide space 21c of the valve housing 21 away from the outlet 21b' not to prevent the flow of liquefied coolant.

Liquefied coolant induced into the in-hole 21a' through the inlet 21a, by the movement of the spool 22, passes through the passage recess 23a formed on the circumferential surface of the spool guide 23, and is discharged out of the valve housing 21 through the out-hole 21b' already open.

At this time, the spool 22 is not moved up because it is continuously pressed downward by the restitutive force of the compressed coil spring 24, and the pressure of liquefied coolant.

The flow control of liquefied coolant is provided by the control of the DC motor 31 according to the program switch 50. When power is applied to the DC motor 31, the rotation shaft 31a of the DC motor 31 is rotated, and the driving force from the rotation shaft 31a is transmitted by the order of the first gear 41→the large gear 42a of the second gear 42→the small gear 42b→the third gear 43. With the third gear 43 rotated at a certain angle, the circular disc cam 44 which is integrated with the third gear 43, is also rotated.

Then the spool 22, coupled with the bellows 25 and supported by the circumferential surface of the circular disc cam 44, is moved up against the elastic force of the compressed coil spring 24 and the pressure of liquefied coolant, thereby gradually shutting the out-hole 21b' of the valve housing 21.

At the same time, the program switch gear 51, coupled with the third gear 43, is rotated with the third gear 43. At this time, the elastic brush 52 fixed on the bottom of the program switch gear 51, contacts the patterns 50a which are formed on the top of the program switch 50 so as to sense the mode of the program switch 50.

Therefore, when the program switch gear 51 reaches a certain mode of the program switch 50, the DC motor 31 stops.

The flow control valve of the present invention controls its levels for the flow control according to the number of modes of the program switch 50. So, the amount of liquefied coolant flow can be controlled to as many as levels of the flow control mode.

FIG. 5 shows that the spool 22 is moved up along the guide space 21c of the valve housing 21 so that the out-hole 21b' of the outlet 21b is completely shut, wherein the circular disc cam 44 is rotated at about 180° for the initial point so that the spool 22 is contacted by the long-radius part 44b of the circular disc cam 44.

As described above, the flow control valve comprises a valve housing having a guide space and an inlet and an outlet formed on the both sides of the valve housing, a spool installed inside the guide space of the valve housing, up/down movably coupled therein so as to control the opening of the outlet, a spool guide placed on the upper side of the guide space, and passing through liquefied coolant by moving up/down along with the spool, a sealing means surrounding the spool on the lower side of the valve housing surrounding the spool so as to prevent the leakage of liquefied coolant, and a driving means having a DC motor therein for moving up/down the spool. The flow control valve allows the proportional control of the flow by minimizing the functional dependence on an expansion agent and a diaphragm thereby improving the flow control function, and increasing the durability.

The flow control valve is not limited to the embodiment described as above, and illustrated in the drawings of the present invention. Therefore, the invention in its broader aspects is not limited to the specific details, and representative devices, shown and described therein. Accordingly, various modifications may be made without departing from the spirit or scope of the general inventive concept as defined by the appended claims and their equivalents.

What is claimed is:

1. A flow control valve comprising:

a valve housing having a guide space and an inlet and an outlet, the inlet and the outlet being in communication with each other through the guide space;

a spool installed inside the guide space of the valve housing and movably disposed therein so as to control the opening of the outlet;

a spool guide disposed at an upper side of the guide space, and operative to move along with the spool while allowing liquefied coolant to pass thereby;

an elastic support for elastically supporting the spool guide to one direction;

a sealing member surrounding the spool on a lower side of the valve housing so as to prevent leakage of liquefied coolant; and a driving mechanism, which includes a direct current (DC) motor, for moving the spool.

2. The flow control valve according to claim 1, wherein said spool guide has a number of passage recesses for allowing liquefied coolant to pass on its circumferential surface.

3. The flow control valve according to claim 1, wherein said spool guide has a number of passage holes at its center.

4. The flow control valve according to claim 1, wherein said inlet of the valve housing and the guide space are provided sequentially in a line, the outlet is provided perpendicularly to the guide space, and an in-hole and an out-hole are provided on the inner end of the inlet and the outlet respectively having a smaller radius than that of the inlet and the outlet respectively, the in-hole and the out-hole being in communication with the guide space.

5. The flow control valve according to claim 1, wherein said sealing member comprises a bellows fixed on a bottom of the valve housing and which surrounds a lower side of the spool.

6. The flow control valve according to claim 1, wherein said driving mechanism further comprises:
- a gear train for transmitting a rotation force of the DC motor; and
- a cam member for moving the spool rotated by the gear train.

7. The flow control valve according to claim 1, wherein said driving mechanism further comprises:
- a bracket for supporting a bottom of the valve housing, the DC motor fixed on a certain position of the bracket;
- a first gear directly connected to the DC motor;
- a second gear having a large gear and a small gear integrated with each other, rotatably fixed on one end of the bracket, and rotated by the first gear;
- a third gear rotatably fixed on the other end of the bracket, and rotated by the second gear;
- a circular disc cam having a short-radius part and a long-radius part, integrated with the third gear, and driving the spool having a bellows coupled thereon; and
- a cam sensing device for sensing a location of the circular disc cam.

8. The flow control valve according to claim 7, wherein at least one surface of a circumferential surface of the circular disc cam and a bottom of the bellows in contact with the circumferential surface is coated with $MoS_2$ to reduce the coefficient of the friction against each other.

9. The flow control valve according to claim 7, wherein said cam sensing device comprises:
- a program switch fixed on a certain position of the bracket, a number of patterns having a certain shape formed on the top of the bracket;
- a program switch gear rotatably fixed on a supporting shaft fixed on a certain position of the bracket and penetrating the program switch; and
- an elastic brush fixed on the bottom of the program switch gear, and in contact with a pattern on the program switch.

10. The flow control valve according to claim 9, wherein a bushing is provided on the supporting shaft so as to support a rotation of the program switch gear.

11. The flow control valve according to claim 7, wherein a recess is formed on a certain position of the bracket, and a shaft guide is fixed on the recess to support a rotation shaft of the DC motor.

12. A flow control valve comprising:
- a valve housing having a guide space and an inlet and an outlet, said inlet and said outlet communicating with each other through said guide space;
- a spool installed inside the guide of the valve housing and movably disposed therein so as to control the opening of the outlet;
- a spool guide movably disposed at an upper side of the guide space, said spool guide having a shape such that the spool guide allows liquid to pass thereby;
- an elastic support for elastically supporting the spool guide against said spool thereby applying downward pressure on said spool;
- a sealing member surrounding the spool on a lower side of the valve housing so as to prevent leakage of liquid; and
- a driving mechanism, which includes a direct current (DC) motor, for moving the spool.

13. The flow control valve according to claim 12, wherein said spool guide is shaped with passage recesses for allowing liquid to pass on a circumferential surface of said spool guide.

14. The flow control valve according to claim 13, wherein said spool guide is shaped with at least one passage hole passing longitudinally through said spool guide.

15. A flow control valve comprising:
- a valve housing having a guide space and an inlet and an outlet, said inlet and said outlet communicating with each other through said guide space;
- a spool installed inside the guide of the valve housing and movably disposed therein so as to control the opening of the outlet;
- spool guide means for allowing liquid to pass through said inlet to said outlet when said spool is movably disposed in an open position, said spool guide means disposed at an upper side of the guide space;
- an elastic support for elastically supporting the spool guide against said spool thereby applying downward pressure on said spool;
- a sealing member surrounding the spool on a lower side of the valve housing so as to prevent leakage of liquid; and
- a driving mechanism, which includes a direct current (DC) motor, for moving the spool.

* * * * *